Patented Mar. 18, 1952

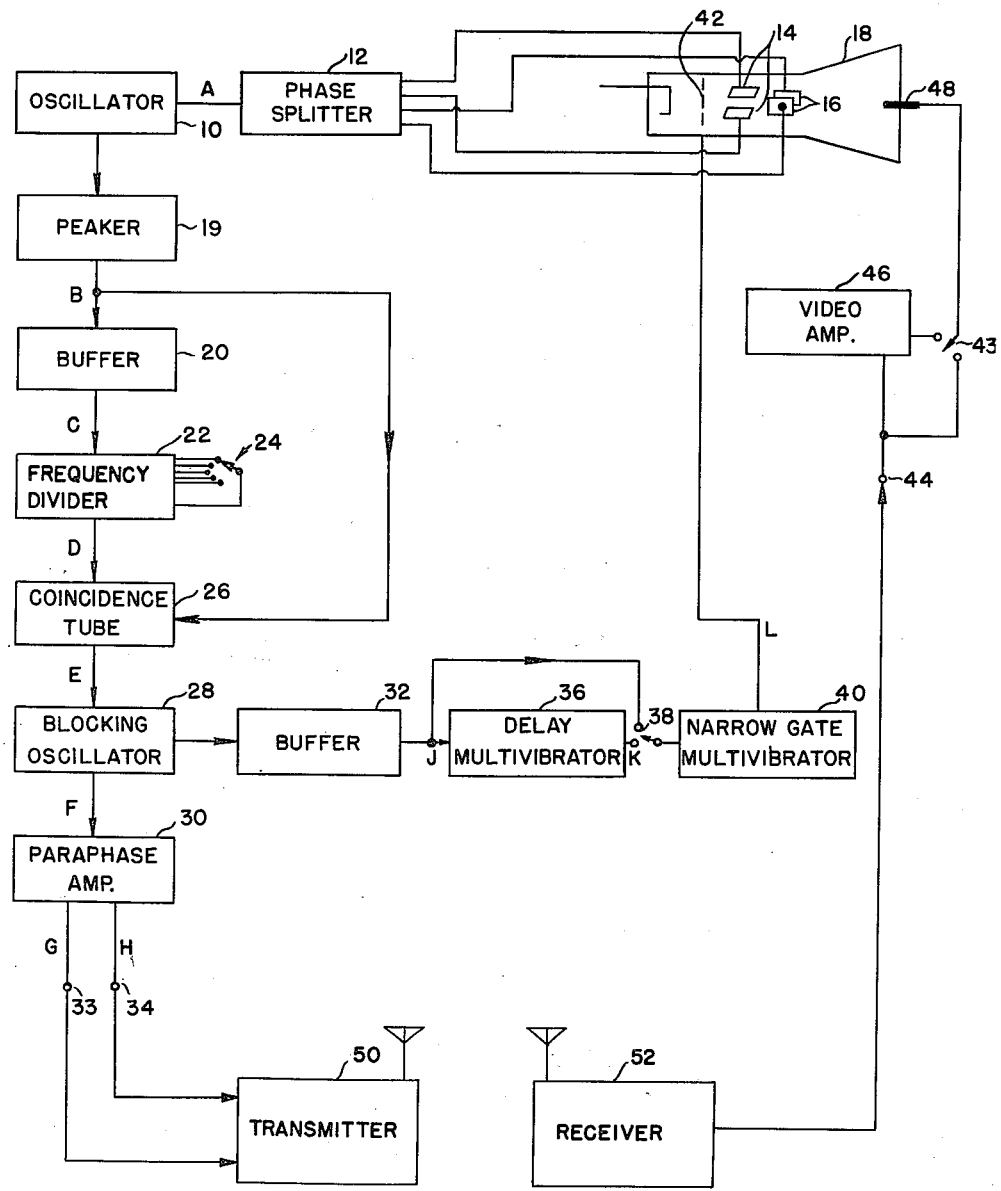

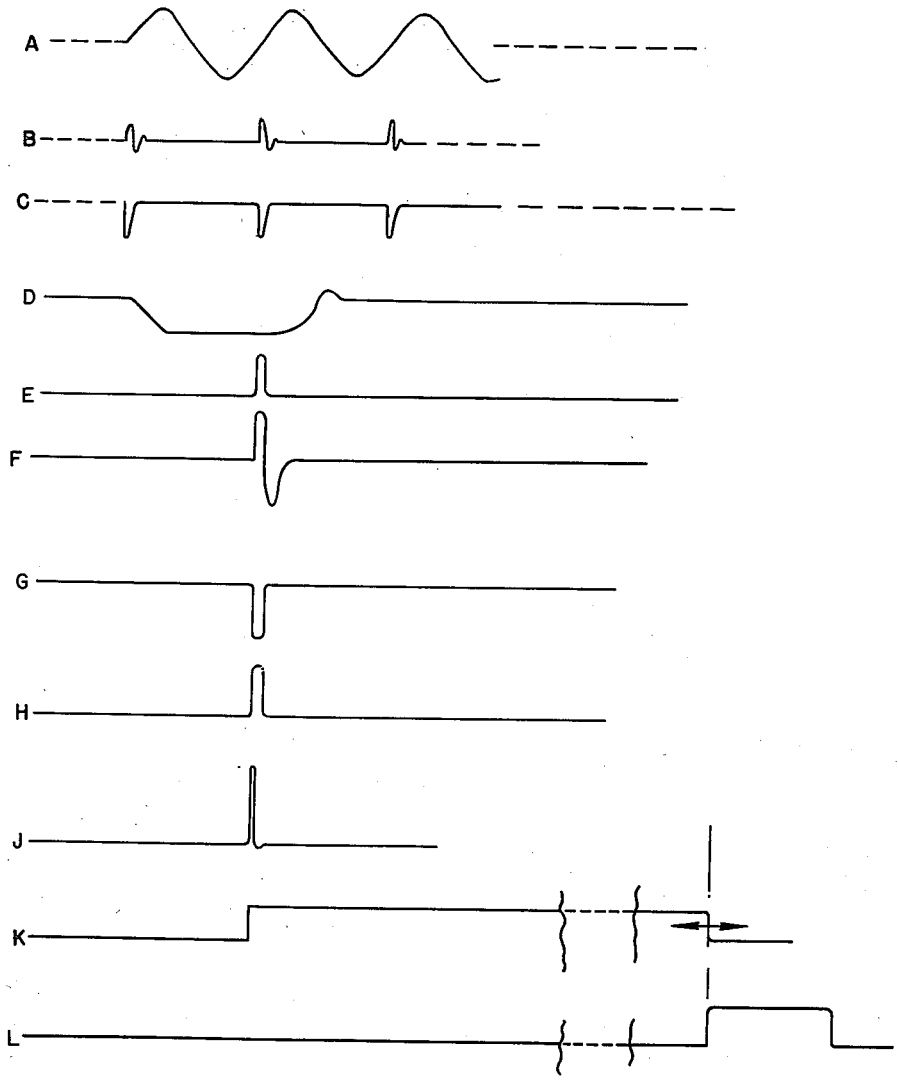

2,589,773

UNITED STATES PATENT OFFICE 2,589,773

VERNIER RANGING CIRCUIT

Britton Chance, Cambridge, and Arden H. Fredrick, Boston, Mass., assignors, by mesne assignments, to the United States of America as represented by the Secretary of War Application October 3, 1945, Serial No. 620,130

1 Claim. (Cl. 315—22)

This invention relates generally to electrical apparatus and more particularly to an indicating apparatus for accurate measurement of small time intervals.

In one system of object location by radio means a series of electromagnetic pulses is transmitted, and echo pulses from reflecting objects are received and applied to an indicator in such a manner that the time interval between transmission and reception of each pulse shows the range of the object. One method of accomplishing this result includes a cathode ray tube indicator in which the electron beam is given a uniform periodic circular displacement of such a frequency that it performs an integral number of revolutions during the interval between successive transmitted pulses. Echo pulses are utilized to give radial displacements to the electron beam, and the positions of these displacements on the circular trace thus indicate the time of occurrence of the echoes and hence the respective ranges of the objects which cause them.

In such an object locating system, it is necessary to provide means for coordinating and synchronizing the production of the sweep trace and that of the transmitted pulse, so that successive transmitted pulses always appear at the same point on the indicator, and the time delay between the transmitted pulse and an echo pulse from a given object may be determined by the position of this echo pulse indication with respect to that of the transmitted pulse.

Many other occasions arise in which accurate determination of small time intervals is necessary. An example of this is a direct measurement of the delay between a voltage pulse applied to a delay device and the output pulse from this device.

It is accordingly an object of this invention to provide a means for producing a periodic displacement of the electron beam of a cathode ray tube, for example, a circular scan, and for producing a keying pulse suitable for application to the transmitter of a radio object locating system. It is a further object to provide means for accurately synchronizing said periodic displacement with said keying pulse. It is another object to provide means for accurately measuring the time interval between said transmitted pulse and an echo pulse received from a given object and for obtaining the range of this object from this time interval. It is a still further object of this invention to adapt this time measuring means to be applicable to the measurement of small time intervals, either between existing voltage pulses or between other phenomena capable of being translated into voltage pulses.

Further objects, features, and advantages of this invention will suggest themselves to those skilled in the art and will become apparent from the following description of the invention taken in connection with the accompanying drawing in which:

Fig. 1 is a block diagram of an apparatus embodying the principles of this invention; and Fig. 2A–L is a series of waveforms of voltages present at various points in the circuit of Fig. 1.

Reference is now made more particularly to Fig. 1, in which crystal oscillator 10 supplies an alternating voltage of a high frequency to phase splitter 12. The frequency of this oscillator is determined by the desired units of the time interval or range to be measured. Phase splitter 12 may be a resistance-capacitance network, a tuned inductance-capacitance circuit, or any other device capable of producing two voltages 90° out of phase with respect to each other from a single-phase input voltage. These quadrature voltages are applied respectively to the vertical deflection plates 14 and the horizontal deflection plates 16 of cathode ray tube indicator 18.

A portion of the output of oscillator 10 is also applied to peaker 19, which may consist of a saturable inductance, an overdriven amplifier followed by a resistance-capacitance differentiator, or any other means of obtaining a periodic pulse from a sinusoidal voltage of the same frequency. These pulses from peaker 19 are applied to buffer 20, which may consist of a triode amplifier stage, the input circuit constants of which are such as to form a differentiator or peaker circuit. The output pulses from buffer 20 are used to synchronize operation of frequency divider 22, which may be a blocking oscillator which is so designed as to produce a pulse, the duration of which is sufficient to include more than one but less than two cycles of crystal oscillator 10. The repetition frequency of this pulse may be changed by manipulating multiple-position switch 24, which changes the time constant in the grid circuit of frequency divider 22, by varying either the resistance or the capacitance.

Output pulses from frequency divider 22 are applied to coincidence tube 26, which also has a second input obtained from peaker 19. These two inputs may be applied on separate grids or on the grid and cathode respectively of coincidence tube 26, the quiescent electrode potentials of which are such that the tube will conduct and amplify a pulse from peaker 19 only when a pulse from frequency divider 22 is simultaneously present. The output of coincidence tube 26 is applied to blocking oscillator 28, which is so designed as to produce a short pulse of the order of one microsecond in duration each time a pulse is received from coincidence tube 26. The pulses obtained from blocking oscillator 28 are applied to paraphase amplifier 30 and buffer 32. Paraphase amplifier 30 may consist of a vacuum tube amplifier having a load resistor in the cathode circuit as well as in the plate circuit so that an output voltage may be obtained across each. These two output voltage pulses are of opposite polarity and are made available at terminals 33 and 34 respectively, and are used to pulse modulate transmitter 50.

Pulses from blocking oscillator 28 also pass through buffer 32, which may be a conventional triode amplifier having a peaker input circuit, to delay multivibrator 36. This multivibrator is of the start-stop or one-shot type common in the art and requiring an input pulse for proper operation. The duration of the output pulse obtained from this circuit may be varied by adjusting the D.-C. bias present on the grid of one of the two vacuum tubes in the circuit. This square wave of adjustable width passes through switch 38 to narrow gate multivibrator 40, the input circuit of which is a peaker or differentiator. Multivibrator 40 is also of the start-stop or one-shot type, and its output pulse duration may be adjusted in a manner similar to that of multivibrator 36. This output pulse is applied to the control grid 42 of cathode ray tube 18. In the alternate position of switch 38, the output pulse of buffer 32 is applied directly to the input of multivibrator 40.

Echoes of pulses transmitted by transmitter 50 are received and detected by receiver 52 and applied to terminal 44. Depending upon the position of switch 43, video pulses applied to terminal 44 are transmitted, either directly or through video amplifier 46, to central deflecting anode 48 located in the center of the face of cathode ray tube 18.

Reference is now made to the waveforms of Fig. 2 for a more detailed explanation of the functioning of the circuit of Fig. 1. The letter designations at various points in Fig. 1 refer to the corresponding waveforms of Fig. 2. The sine wave output of oscillator 10 is shown in Fig. 2A. Except for phase differences, the waveforms of the voltages produced by phase splitter 12 are like that of Fig. 2A. By applying these quadrature voltages to the vertical and horizontal deflection plates of cathode ray tube 18, a circular deflection of the electron beam is produced in the manner common in the art. The output of peaker 19 is shown in Fig. 2B. After passing through buffer 20 and its associated peaker input circuit, the voltage waveform becomes as shown in Fig. 2C and is applied to frequency divider 22 as a trigger. After a cycle of operation of frequency divider 22 has been initiated by a synchronizing pulse from buffer 20, frequency divider 22 becomes insensitive to further pulses for a relatively long time, so that a frequency division is effected. The duration of the insensitive period, and therefore the frequency division ratio, may be adjusted by altering the time constant in the grid circuit of frequency divider 22 as previously described. This adjustment causes the natural period of the frequency dividers to be approximately equal to a desired multiple of that of oscillator 10, and the pulse from buffer 20 then serves to lock it in at the exact submultiple frequency.

The output pulse of frequency divider 22 is shown in Fig. 2D, and, as can be seen, it is of sufficient duration to include the succeeding trigger pulse from peaker 19. Since the first pulse in Fig. 2C, which synchronizes frequency divider has terminated before the blocking oscillator output pulse has reached a level sufficient to render coincidence tube 26 operative, only the second pulse is amplifed by this tube, and its output is shown in Fig. 2E. The short pulse generated by blocking oscillator 28 in synchronism with the pulse of Fig. 2E is shown in Fig. 2F. This latter pulse, when applied to paraphase amplifier 30, results in the two output trigger pulses of opposite polarity shown in Figs. 2G and 2H respectively. The input circuit of buffer 32 acts as a peaker, and the resulting trigger pulse from this amplifier, as shown in Fig. 2J, is considerably sharper than the input pulse from blocking oscillator 28.

Delay multivibrator 36, when triggered by the pulse of Fig. 2J, produces the rectangular wave output of variable duration shown in Fig. 2K. When the termination of this rectangular wave is used to trigger narrow gate multivibrator 40, the narrow gate output of the latter is as shown in Fig. 2L, having its initial point at the termination of the rectangular pulse of Fig. 2K. If switch 38 is in a position such that the trigger from buffer 32 passes directly to multivibrator 40, then the output of the latter will be initiated at the same time as the square wave of Fig. 2K. The duration of the rectangular wave of Fig. 2L may be made variable if desired by placing an adjustable capacitor in the grid circuit of multivibrator 40.

The narrow gate is applied to the control grid 42 of cathode ray tube 18, which is so biased that no trace appears on the screen of this cathode ray tube except when the narrow gate pulse is present. By adjusting the width of the narrow gate, the trace may be made to appear during a variable portion of one sweep. Thus only the video pulses applied to the central deflecting anode 48 in the face of the indicator tube while the narrow gate is present cause visible radial deflections of the circular trace as described above.

When the apparatus is used to determine range, one of the two trigger pulses present at terminals 33 and 34 may be applied to the modulator of a radio object locating transmitter, and echo pulses from the receiving portion of this system may be applied through terminal 44 either directly or through video amplifier 46 to anode 48 of cathode ray tube 18. Because the repetition frequency of the trigger supplied to the modulator is much lower than the original oscillator frequency due to the frequency division of blocking oscillator 22, several revolutions of the beam of cathode ray tube 18 occur during the interval between successive transmitted pulses. Only one or a portion of one revolution is made visible, however, due to the action of the narrow gate previously explained. This method of presentation affords accuracy of range determination due to the expanded time scale on which echo pulses may occur, and at the same time, confusion of echoes occurring during different beam revolutions is avoided by the action of the narrow gate. Delay multivibrator 36 may be made variable either continuously or in steps, so that any selected portion of the total sweep of the electron beam occurring between transmitted pulses may be rendered visible. To illuminate the portion of the sweep occurring directly after the transmitted pulse, switch 38 is turned so that narrow gate multivibrator 40 is triggered directly by the pulse from buffer 32 rather than from delay multivibrator 36.

The range of any reflecting object may be determined by the position of its echo pulse on the sweep trace with respect to the main transmitted pulse, a portion of which is coupled from the transmitting to the receiving portion of the system. If the transmitted pulse does not appear on the visible portion of the trace, the range may be determined by observing the setting of the potentiometer of delay multivibrator 36 necessary to cause echoes from the target to be visible and combining this information with the position of the echo pulse on the circular trace. Both the potentiometer of delay multivibrator 36 and the periphery of the face of the indicator tube may be calibrated to facilitate these range measurements.

It is obvious that the use of the apparatus described need not be confined to the measurement of range in an object locating system but may also be extended to include the measurement of time intervals in general. For example, the time delay of a pulse in passing over a transmission device might be measured by applying pulses from terminals 33 or 34 to the input of the device and applying pulses from its output to terminal 44.

While there has been described what is at present considered to be the preferred embodiment of this invention, it will be obvious to those skilled in the art that various changes and modifications may be made therein without departing from the scope of the invention as set forth in the appended claim.

The invention claimed is:

A device for measurement of time intervals, including an oscillator, a phase splitter coupled to the output of said oscillator for producing two alternating voltages in time quadrature, a cathode ray tube indicator having a central deflecting anode, means for applying said alternating voltages to said cathode ray tube so as to produce a circular deflection of the electron beam of said tube, means for applying video pulses from an external source to said central deflecting anode, a peaking means coupled to the output of said oscillator, a first blocking oscillator synchronized by the output from said peaking means, coincidence means coupled to the outputs of both of said oscillators, a second blocking oscillator synchronized by the output pulses of said coincidence means, delay means coupled to the output of said second blocking oscillator, square wave generator means, means for selectively applying the output of said second blocking oscillator and the output of said delay means to the input of said square wave generator means, and means for utilizing the output of said square wave generator means to cause a visible trace to be produced on the screen of said cathode ray tube indicator during a selected interval of time.

BRITTON CHANCE.
ARDEN H. FREDRICK.

REFERENCES CITED

The following references are of record in the file of this patent:

UNITED STATES PATENTS

| Number | Name | Date |
|---|---|---|
| 2,403,600 | Holmes et al. | July 9, 1946 |
| 2,407,272 | Hart | Sept. 10, 1946 |
| 2,411,572 | Hershberger | Nov. 29, 1946 |
| 2,416,088 | Deerhake | Feb. 18, 1947 |
| 2,427,029 | Stearns | Sept. 9, 1947 |
| 2,446,244 | Richmond | Aug. 3, 1948 |
| 2,450,341 | Hershberger | Sept. 28, 1948 |
| 2,470,464 | Bowie | May 17, 1949 |